United States Patent [19]
Alexeev et al.

[11] Patent Number: 4,898,457
[45] Date of Patent: Feb. 6, 1990

[54] OPTICAL SYSTEM OF TELEVISION CAMERA

[76] Inventors: Viktor N. Alexeev, prospekt, 12, korpus 2, kv. 32, Leningrad, Tikhoretsky; Irina L. Antiropova, prospekt, 128, kv. 10, Leningrad, Nevsky; Artemy L. Lisenko, Dimitrova, 24, korpus 2, kv. 87, Leningrad, ulitsa, all of U.S.S.R.

[21] Appl. No.: 902,410
[22] PCT Filed: Dec. 20, 1984
[86] PCT No.: PCT/SU84/00074
  § 371 Date: Jul. 28, 1986
  § 102(e) Date: Jul. 28, 1986
[87] PCT Pub. No.: WO86/03917
  PCT Pub. Date: Jul. 3, 1986
[51] Int. Cl.$^4$ ............... G02B 9/00; G02B 9/34; G02B 9/62; G02B 13/16
[52] U.S. Cl. ............... 350/463; 313/371; 313/524; 350/412; 350/464; 350/469; 358/225
[58] Field of Search ............... 350/463, 464, 469, 412; 313/524, 371; 358/225

[56] References Cited

U.S. PATENT DOCUMENTS 2,587,589  3/1952  Bordewieck ............ 313/524
2,917,574  12/1959  Toulon ............ 313/371
3,194,117  7/1965  VanGraafeiland ............ 350/469
3,429,997  2/1969  Rosner et al. ............ 358/225
3,565,511  2/1971  Dilworth ............ 350/415

FOREIGN PATENT DOCUMENTS 2535138  10/1984  France .
218471  3/1967  U.S.S.R. .
843304  12/1976  U.S.S.R. .
718820  10/1977  U.S.S.R. .
672594  1/1978  U.S.S.R. .

OTHER PUBLICATIONS

The Journal of the Institute of Television Engineers of Japan, 3, vol. 35, No. 3, 1981, p. 3.

*Primary Examiner*—Scott J. Sugarman
*Attorney, Agent, or Firm*—Lilling & Greenspan

[57] ABSTRACT

An optical system of a television camera comprises, according to the invention, arranged in the direction of the light flux on one optical axis, an objective composed of n elements and a faceplate of a television tube, a light-sensitive layer being located on the last, in the direction of the light flux, surface of said faceplate. The last, in the direction of the light flux, element of the objective has an optical power other than zero and is made as, for example, a concave-flat lens having its concavity facing the object. This last element is the faceplate (3) of the television tube (4).

15 Claims, 12 Drawing Sheets

OPTICAL SYSTEM OF TELEVISION CAMERA

FIELD OF THE INVENTION

This invention relates to television equipment and, in particular, is concerned with optical systems for television cameras.

DESCRIPTION OF THE PRIOR ART

Given the world-wide tendency to improve the television picture by attaining better resolution of the optical system of the television camera or of the television tube up to 2125 lines, development of television cameras is presently concentrated on refinement of their optical and electrical parameters.

Known in the art is an optical system of the Volna-801 television camera which is quite popular in the Soviet Union. This optical system comprises, arranged successively downstream of the luminous flux and on one optical axis, an objective lens having n elements, and a faceplate of the television tube, and a light-sensitive layer being located on the last surface of the faceplate relative to the direction of the luminous flux.

This optical system is a four-element objective with a focal length of 15 mm, and a relative aperture of 1:2.8. The TV tube is a half-inch separate-mesh vidicon, electrostatically focused and magnetically deflected. The faceplate of the television tube is a plane-parallel plate.

The disadvantages of this optical system are as follows. The image produced by the optical system of the television camera is of poor quality, and the resolution of the objective in the center of the frame is 400 lines. This optical system cannot, therefore, be used for monitoring precision manufacturing processes, disclosure of fine grain structures, or other tasks which require high resolution of the optical system.

Known in the art is an optical system of a television camera (cf., for example, The Journal of the Institute of Television Engineers of Japan, Vol. 35, No. 3, 1981, p. 3), which comprises, arranged successively downstream of the luminous flux and on one optical axis, an objective having n elements, and a faceplate of the television tube having a light-sensitive layer located on the last surface therof in relation to the direction of the luminous flux.

This optical system is a five-element objective with a focal length of 16 mm and an aperture ratio of 1:1.7. The faceplate is a plane-parallel plate. The television tube is a saticon-type tube with a resolution of 500 lines.

This optical system is deficient in that the television camera equipped with this system cannot produce a high-quality picture, and the optical system cannot, therefore, be used to deal with tasks involving high resolution of the image.

SUMMARY OF THE INVENTION

The invention is to provide a television camera optical system wherein the objective and faceplate of the television tube permit substantial improvement of the television picture produced on the screen.

There is provided a television camera optical system comprising, arranged successively in the direction of the light flux and on one optical axis, an objective having n elements, and a television tube faceplate, a light sensitive layer being located on the last surface thereof in relation to the direction of the light flux. According to the invention, the last, in relation to the direction of the luminous flux, element of the objective has an optical power other than zero and is the faceplate of the television tube.

If the optical system of the television camera is to have a wide field, the last element of the objective is advisable to be made as a concave-flat lens having the concavity thereof facing the object.

It is desirable that, when the field of long focal-length optical systems of television cameras is small and does not exceed 20°, the last element of the objective should be made as a positive convex-flat lens having the convexity thereof facing the object.

For long focal-length optical systems of mixed-field television tubes, whose resolution is close to the ultimate, it is advisable that the last element of the objective should be a biconcave lens.

For optical systems having medium fields and operating in television tubes whose resolution is close to the ultimate, it is reasonable that the last element of the objective should be a flat-concave lens having the concavity thereof facing the picture.

For long focal-length optical systems having medium angular fields and operating in television tubes, such as vidicon, EBS vidicon, or saticon, it is reasonable that the last element of the objective should be a negative meniscus having the concavity thereof facing the picture.

The last element of the objective can also be a positive meniscus having the concavity thereof facing the picture.

The last element of the objective can also have parameters which permit correction of chromatic aberrations for various field angles within a broad spectral range, and it is desirable that the last element of the objective should be cemented positive and negative meniscuses having the concavity thereof facing the picture.

For wide-angle optical systems operating over a wide spectral range, it is advisable that the last element of the objective should be negative and positive meniscuses cemented together and having the concavity thereof facing the picture.

It is reasonable, also, that the last element of the objective be made as biconvex and biconcave lenses cemented together.

The optical system of a television camera, according to the invention, offers the advantage of a high-quality television picture, even reaching its ultimate, of monochrome television special-purpose cameras.

BRIEF DESCRIPTION OF THE DRAWINGS

The invention will now be described in more detail with reference to the accompanying drawings, in which.

DETAILED DESCRIPTION OF THE INVENTION

An optical system of a television camera, according to the invention, comprises, arranged successively in the direction of the light flux on one optical axis 1 (FIG. 1), an objective 2 composed of n elements, and a faceplate 3 of a television tube 4.

Figure 1:
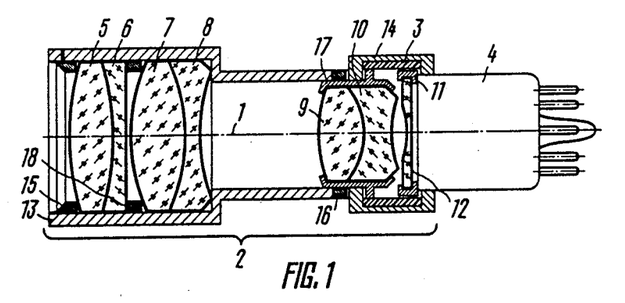
FIG. 1 is a top view, in section, showing an embodiment of an optical system of a television camera, according to the invention.

The first, in the direction of the light flux, element of the objective 2 is made of a biconvex lens 5 and a biconcave lens 6 cemented together. The second, in the direction of the light flux, element of the objective 2 is made of a biconvex lens 7 and a biconcave lens 8 cemented together. The third, in the direction of the light flux, element of the objective 2 is made of a biconvex lens 9 and a biconcave lens 10 cemented together. The last, in the direction of the light flux, element of the objective 2 has an optical power other than zero and is the faceplate 3 of the television tube 4.

In this embodiment of the optical system of a television camera, the last element of the objective 2 is a concave-flat lens which is hereinafter referred to as lens 3 having its concavity facing the object and placed in a mount 11 secured in the butt end of the housing of the television tube 4. A light-sensitive layer 12 is located on the last, in the direction of the light flux, surface of the lens 3.

The objective 2 is placed in a case 13 secured to the housing of the television tube 4 by an intermediate frame 14. The first and third elements of the objective 2 are installed in the case 13 so that they can travel by means of threaded rings 15 and 16. The third element is secured in a mount 17. A spacer ring 18 is inserted between the first and second elements of the objective 2.

This embodiment of the optical system of a television camera, according to the invention, should advisably be used when the angular fields exceed 50°.

Figure 2:
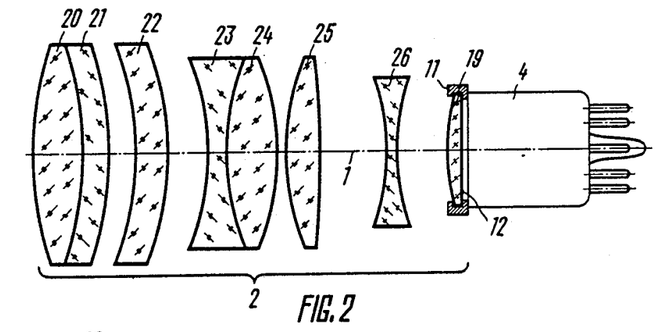
FIG. 2 shows an optical arrangement of another embodiment of the optical system of FIG. 1.

Long focal-length optical systems of television cameras can successfully use the arrangement of FIG. 2 when the field is not broad and does not exceed 20°.

This embodiment of the optical system is similar to that shown in FIG. 1.

The difference consists in that the last element of the objective 2 is a positive convex-flat lens 19 whose convexity faces the object.

The first, second, third, fourth, and fifth elements of the objective 2 are, respectively, a biconvex lens 20 and a negative meniscus 21 cemented together, a negative meniscus 22, a biconcave lens 23 and a biconvex lens 24 cemented together, a biconvex lens 25, and a biconcave lens 26.

Figure 3:
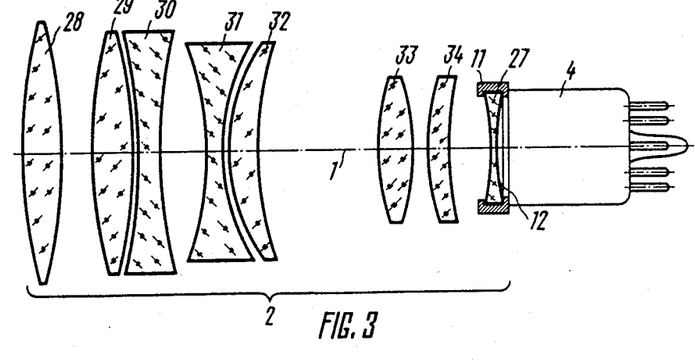
FIG. 3 shows an optical arrangement of still one more embodiment of the optical system of FIG. 1.

It is advisable that, for wide-angle television cameras whose resolution is close to the ultimate, the optical system of a television camera of FIG. 3 is used.

In contrast to the optical system of FIG. 1, in this embodiment the last element of the objective 2 is a biconcave lens 27.

The first, second, third, fourth, fifth, sixth, and seventh elements of the objective 2 are, respectively, a biconvex lens 28, a biconvex lens 29, a biconcave lens 30, a biconcave lens 31, a positive meniscus 32 whose concavity faces the picture, a biconvex lens 33, and a positive miniscus 34 whose concavity faces the picture.

Figure 4:
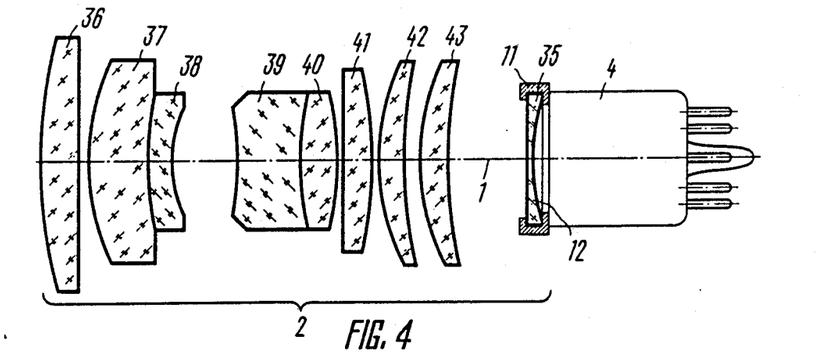
FIG. 4 shows an optical arrangement of the optical system of a television camera, according to the invention, illustrated in FIG. 1, which is provided with a faceplate made as a flat-concave lens.

For television cameras with fields ranging from 30° to 60° and equipped with television tubes whose resolution is close to the ultimate, it is advisable that the optical system of FIG. 4 be used.

In contrast to the embodiment of FIG. 1, the last element of the objective 2 is a flat-concave lens 35 whose concavity faces the picture.

The first, second, third, fourth, fifth, and sixth elements of the objective 2 are, respectively, a biconvex lens 36 a positive meniscus 37 and a negative meniscus 38 cemented together and having the concavity thereof facing the picture, a biconcave lens 39 and biconvex lens 40 cemented together, a positive meniscus 41 whose concavity faces the object, a positive miniscus 42 whose concavity faces the picture, and a positive meniscus 43 whose concavity faces the picture.

Figure 5:
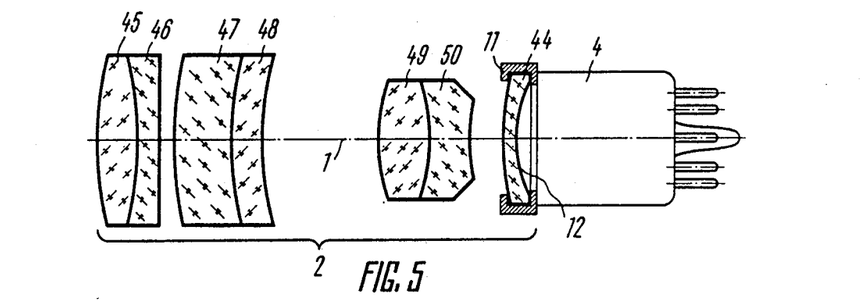
FIG. 5 shows an optical arrangement of one of the embodiments of the optical system of FIG. 1.

For television cameras equipped with long focal-length objectives with pickup fields ranging from 15° to 40°, it is reasonable that the television camera optical system of FIG. 5 be used.

In contrast to the embodiment of FIG. 1, the last element of the objective 2 is a negative meniscus 44 whose concavity faces the picture.

The first, second, and third elements of the objective 2 are, respectively, a biconvex lens 45 and a negative meniscus 46 whose concavity faces the object, which are cemented together, a negative meniscus 47 and a positive meniscus 48 having their concavities facing the picture and cemented together, and a biconvex lens 49 and biconcave lens 50 cemented together.

Figure 6:
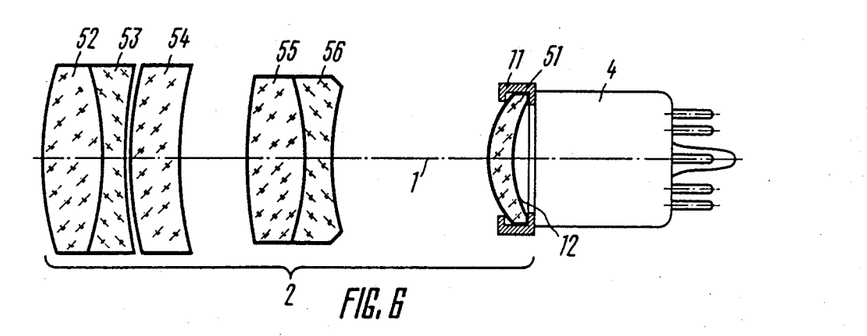
FIG. 6 shows an optical arrangement of one more embodiment of the optical system of FIG. 1.

There is also an embodiment shown in FIG. 6, which can be used as an optical system of a television camera, according to the invention.

As distinct from the embodiment of FIG. 1, the last element of the objective 2 is a positive meniscus 51 whose concavity faces the picture.

The first, second, and third elements of the objective 2 are, respectively, a biconvex lens 52 and a biconcave lens 53 cemented together, a negative meniscus 54 whose concavity faces the picture, and a biconvex lens 55 and a biconcave lens 56 cemented together.

Figure 7:
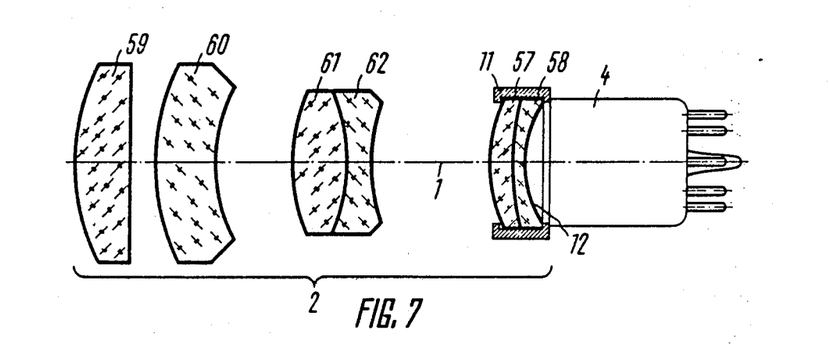
FIG. 7 shows an optical arrangement of the television camera optical system of FIG. 1, according to the invention, equipped with a faceplate made of positive and negative meniscuses cemented together.

The embodiment of FIG. 7 of a television camera optical system, according to the invention, can be used when correction of chromatic aberrations over a broad spectral range is necessary.

As distinct from the embodiment of FIG. 1 of a television camera optical system, the last element of the objective 2 is a positive meniscus 57 and a negative meniscus 58 cemented together and having their concavities facing the picture.

The first, second, and third elements of the objective 2 are, respectively, a positive meniscus 59 whose concavity faces the picture, a negative meniscus 60 whose concavity faces the picture, and a biconvex lens 61 and a biconcave lens 62 cemented together.

Figure 8:
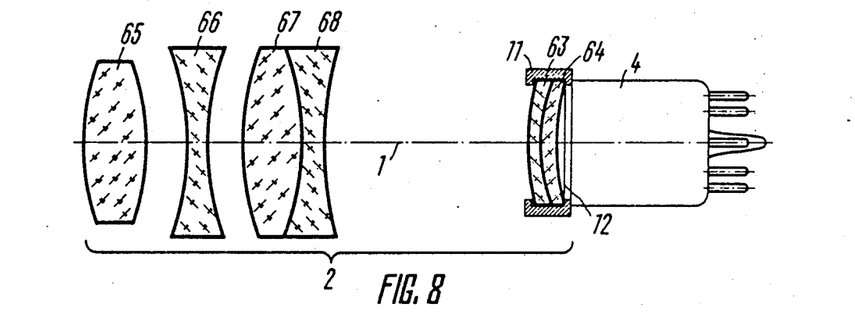
FIG. 8 shows an optical arrangement of the optical system of FIG. 1, featuring a faceplate made as negative and positive meniscuses cemented together, according to the invention.

Also used as a television camera optical system is the embodiment of FIG. 8, according to the invention.

As distinct from the embodiment of FIG. 1, the last element of the objective 2 is a combination of a negative meniscus 63 and a positive meniscus 64 cemented together and having their concavities facing the picture.

The first, second, and third elements of the objective 2 are, respectively, a biconvex lens 65, a biconcave lens 66, and a combination of a biconvex lens 67 and a biconcave lens 68 cemented together.

Figure 9:
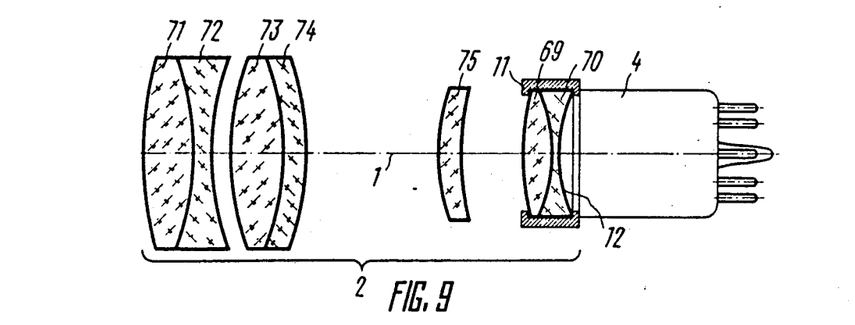
FIG. 9 shows an optical arrangement of the television camera optical system of FIG. 1, featuring a face-plate made as biconvex and biconcave lenses cemented together, according to the invention.
Figure 10:
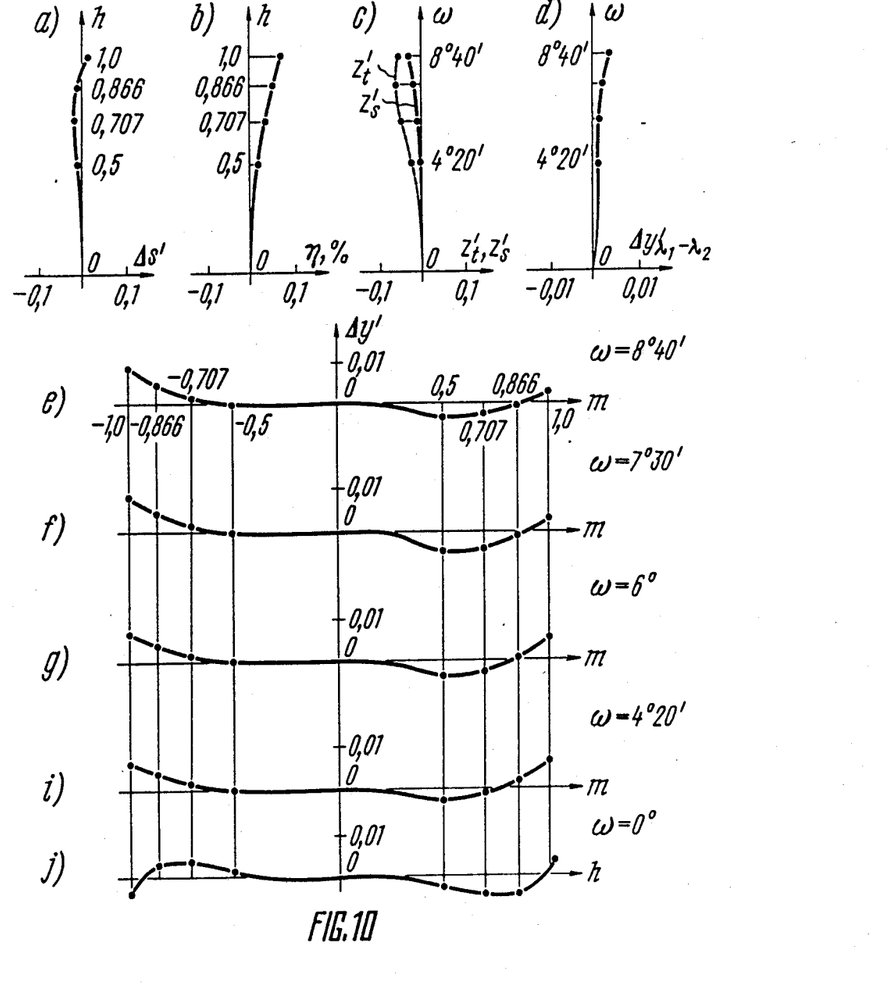
FIG. 10 shows charts of residual aberrations of the optical system of FIG. 1.
Figure 11:
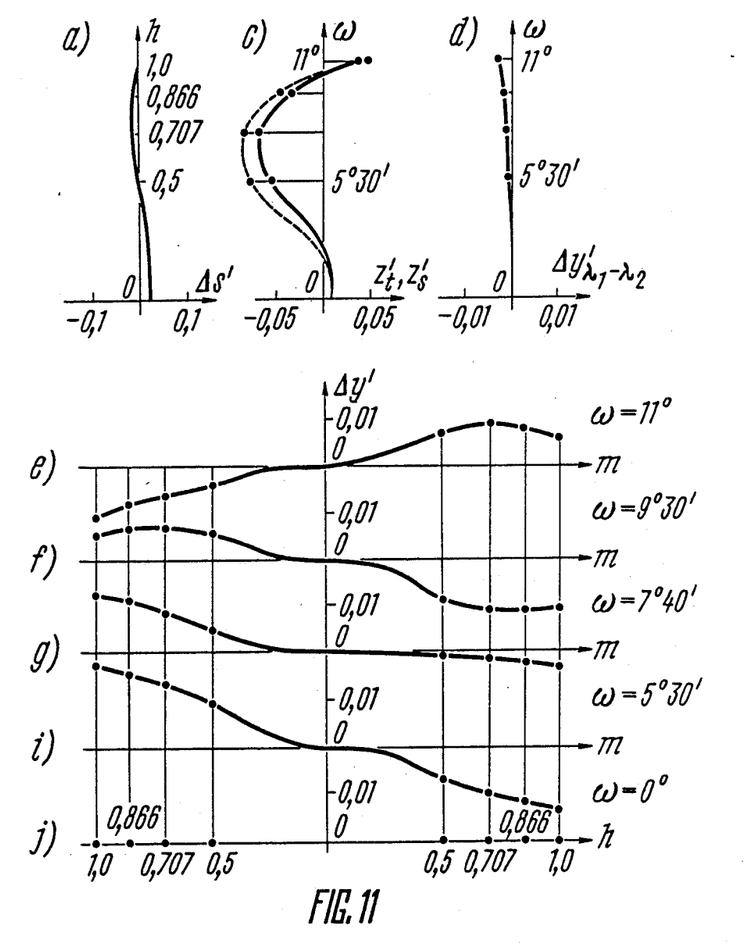
FIG. 11 shows charts of residual aberrations of the optical system of FIG. 2.
Figure 12:
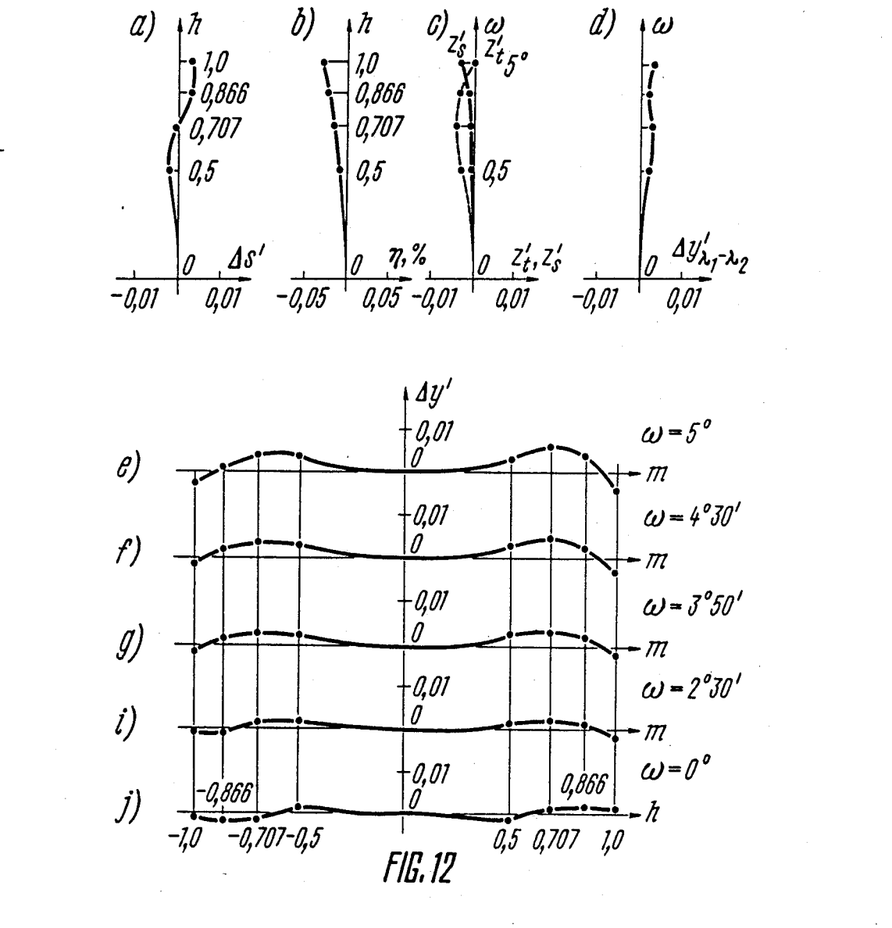
FIG. 12 shows charts of residual aberrations of the optical system of FIG. 3.
Figure 13:
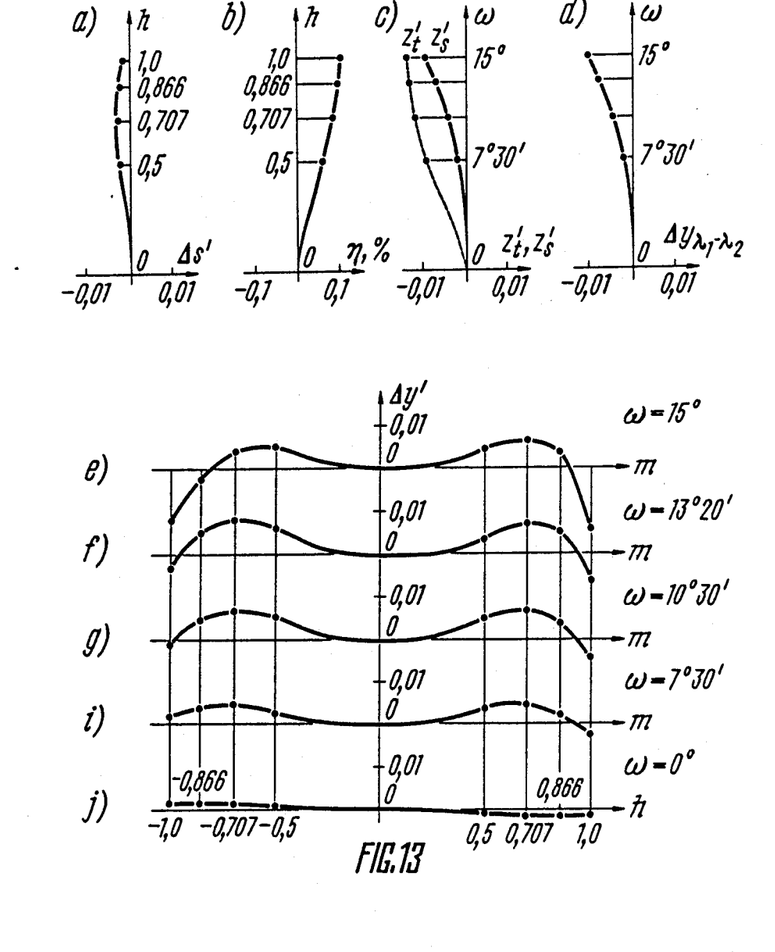
FIG. 13 shows charts of residual aberrations of the optical system of FIG. 4.
Figure 14:
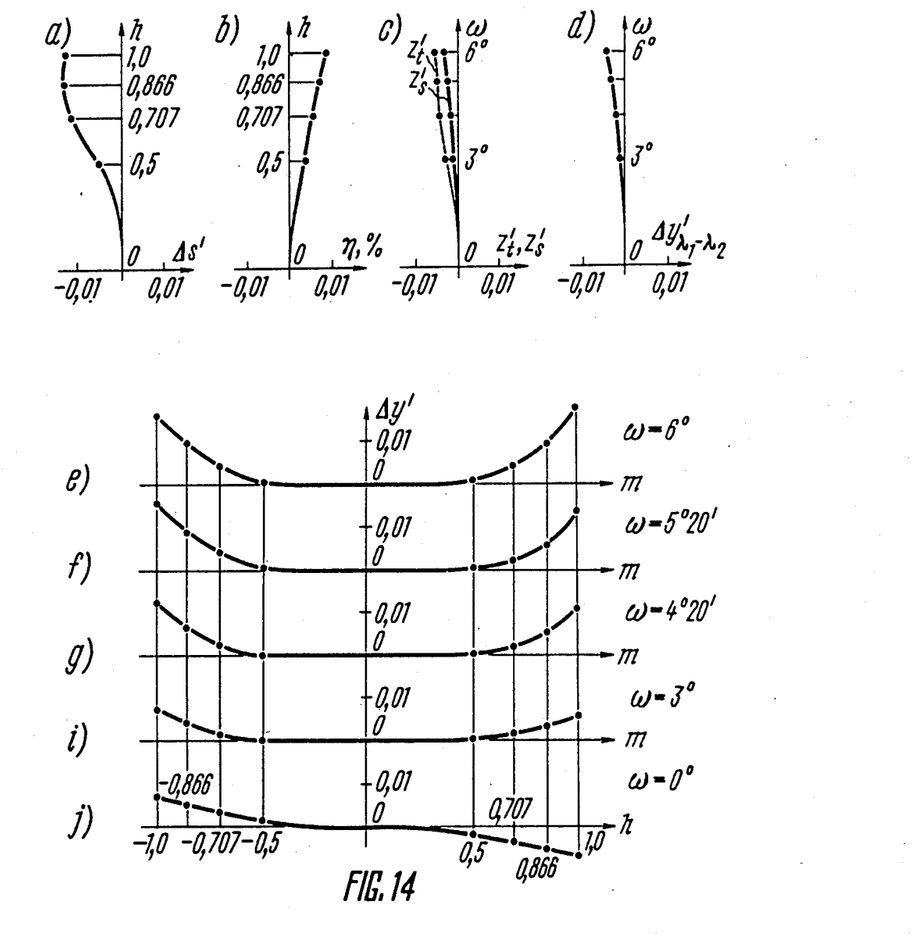
FIG. 14 shows charts of residual aberrations of the optical system of FIG. 5.
Figure 15:
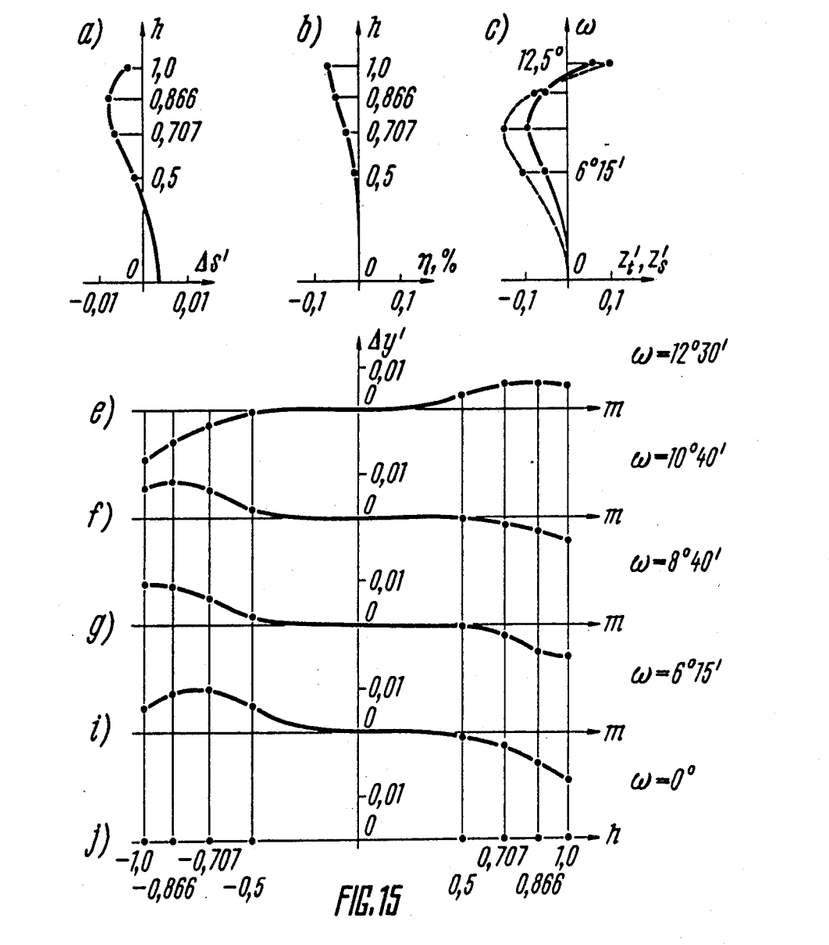
FIG. 15 shows charts of residual aberrations of the optical system of FIG. 6.
Figure 16:
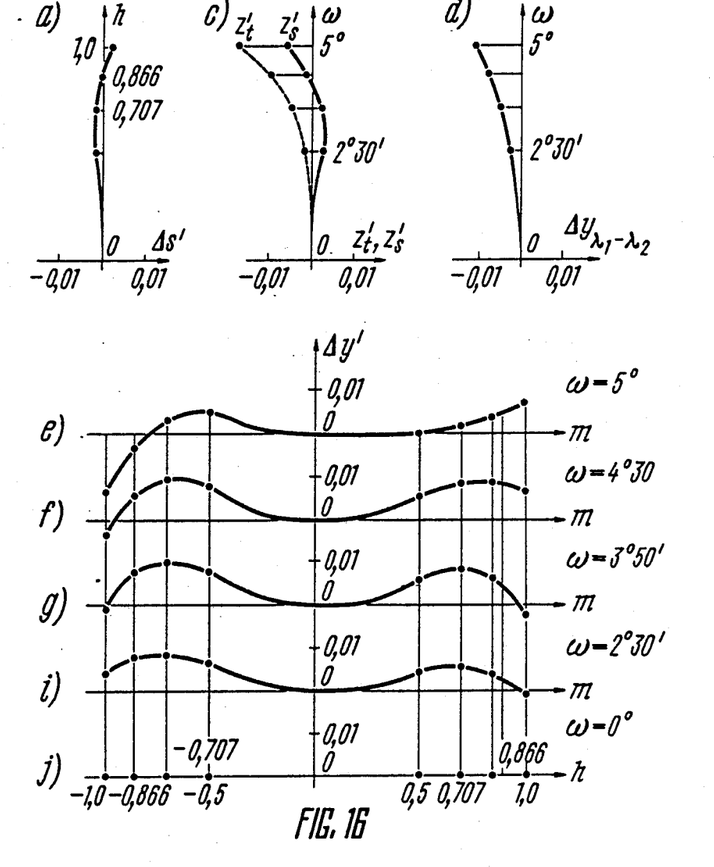
FIG. 16 shows charts of residual aberrations of the optical system of FIG. 7.
Figure 17:
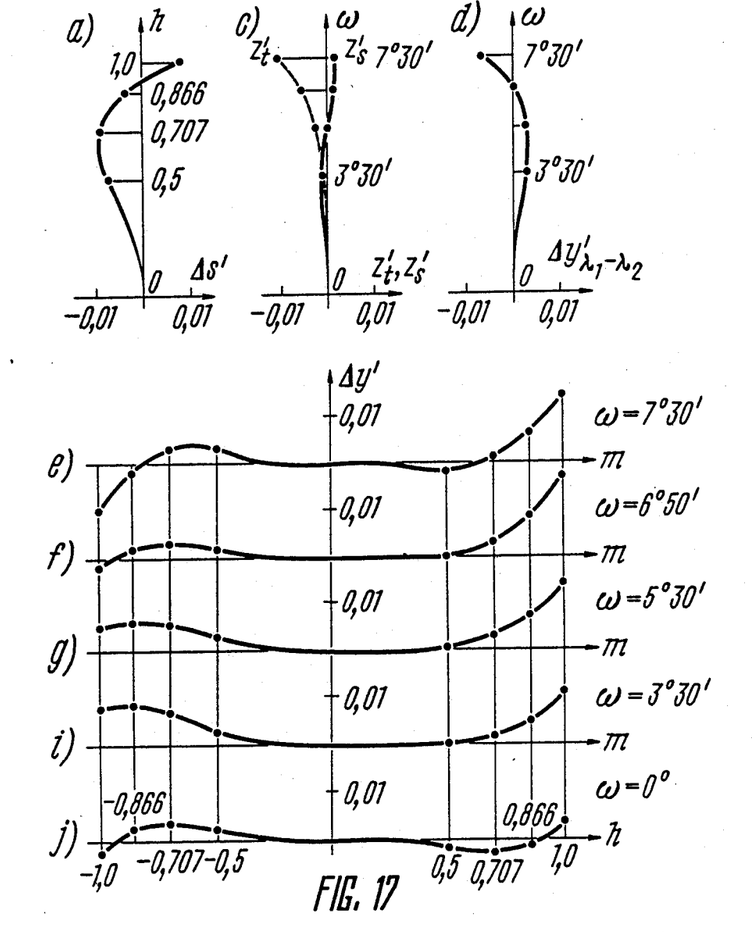
FIG. 17 shows charts of residual aberrations of the optical system of FIG. 8.
Figure 18:
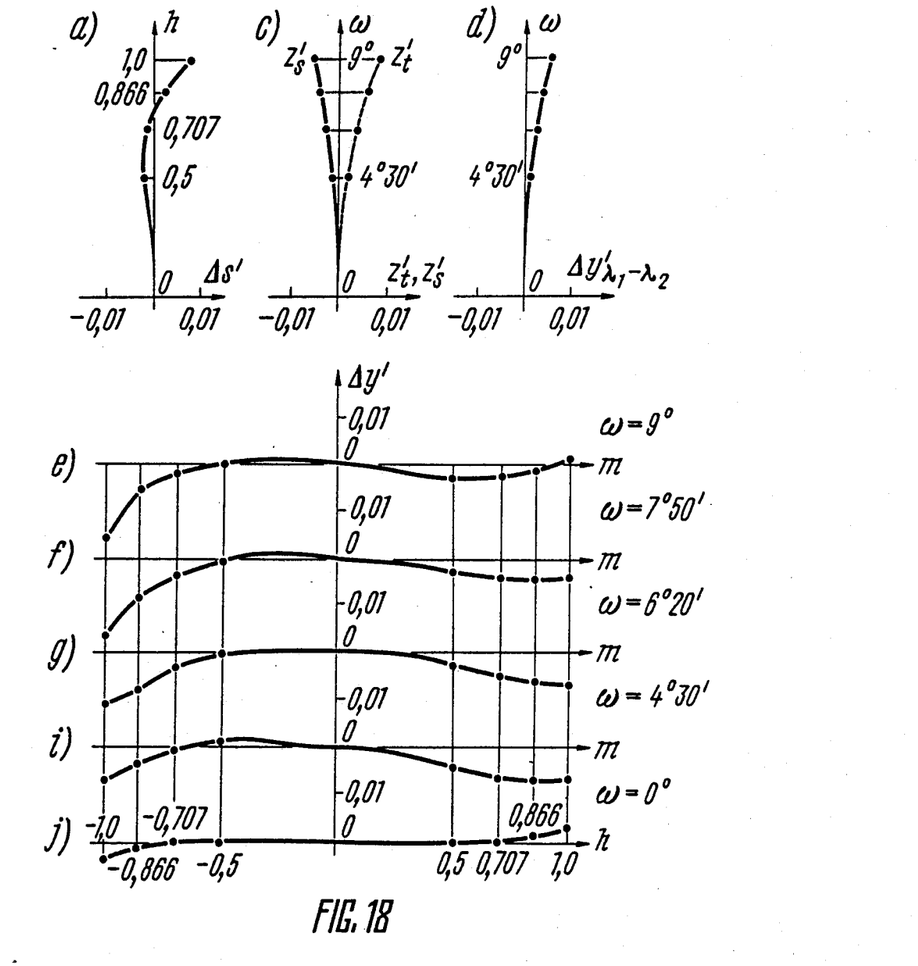
FIG. 18 shows charts of residual aberrations of the optical system of FIG. 9.

An optical system of a television camera can also be made as shown in the embodiment of FIG. 9.

As distinct from the embodiment of FIG. 1, the last element of the objective 2 is a combination of a biconvex lens 69 and biconcave lens 72 cemented together.

The first, second, and third elements of the objective 2 are, respectively, a combination of a biconvex lens 71 and a biconcave lens 72 cemented together, a combination of a biconvex lens 73 and a negative meniscus 74 whose concavity faces the object, which are cemented together, and a positive meniscus 75 whose concavity faces the picture.

The optical system of a television camera, according to the invention, operates as follows.

The light flux comes into the optical system which produces an optical image on the last, in the direction of this light flux, surface of the last element of the objective 2 (FIG. 1), whereon the light-sensitive layer 12 is applied. The last element of the objective 2 has an optical power other than zero and serves, simultaneously, as the faceplate 3 of the TV tube 4.

The specific embodiment of the last element of the objective 2 can be in different forms. Much depends here on the magnitude and sign of the residual aberrations of the n-1 elements of the objective 2. Thus, for example, the last element can be a flat-concave lens 3 (FIG. 1) having its concavity facing the object, or a convex-flat lens 19 (FIG. 2) having its convexity facing the object, or as a biconcave lens 27 (FIG. 3), or as a flat-concave lens 35 (FIG. 4) having its concavity facing the picture, or as a negative meniscus 44 (FIG. 5) having its concavity facing the picture, or as a positive meniscus 51 (FIG. 6) having its concavity facing the picture, or as a combination of a positive meniscus 57 (FIG. 7) and a negative meniscus 58 cemented together and with the concavity facing the picture, or as a combination of a negative meniscus 63 (FIG. 8) and a positive meniscus 64 cemented together and with the concavity facing the picture, or as a combination of a biconvex lens 69 (FIG. 9) and a biconcave lens 70 cemented together. To summarize, the last element of the objective 2 may have different optical power, both in sign and magnitude, different shape, and different refractive index of the optical material. It can, therefore, neutralize various, in absolute magnitude and sign, residual aberrations and thus improve the quality of the television picture produced by the television camera.

The high quality of pictures produced by means of the optical system of a television camera, which is the subject of the present invention, is substantiated by the charts of residual aberrations of the optical system, given in FIGS. 10 through 18.

The references in FIGS. 10, 11, 12, 13, 14, 15, 16, 17, and 18 are as follows.

(a)—chart of the residual spherical aberration for an axial point;

(b)—chart of the residual non-isoplanatism in percent for an axial point;

(c)—chart of the residual astigmatism for an off-axis point;

(d)—chart of the residual lateral chromatic aberration for an off-axis point;

(e), (f), (g), (i)—charts of the residual aberrations of broad oblique beams;

(j)—chart of the transverse spherical aberration for an axial point;

(h)—relative beam height in the pupil;

$\Delta s'$—axial spherical aberration in mm;

$\eta$—axial non-isoplanatism in percent;

$\omega$—angular field in angular degrees;

$z'_t$—tangential curvature in mm;

$z'_s$—sagittal curvature in mm;

$\Delta Y \lambda_1 - \lambda_2$—lateral chromatic aberration for an offaxial point in mm;

$\Delta Y'$—transverse spherical aberration for broad oblique beams;

m—relative beam height in the pupil, meridional section.

The optical system of a television camera, whose optical arrangement is shown in FIG. 1, has an angular field of 17.5°, a relative aperture of 1:1.2, a focal length of 54 mm. Residual aberrations (FIG. 10) do not exceed 0.01 mm for an axial point, and 0.03 mm for an off-axis point on the picture edge.

The optical system of a television camera, whose optical arrangement is shown in FIG. 2, has an angular field of 22°, a relative aperture of 1:1.5, a focal length of 41.2 mm. Residual aberrations (FIG. 11) do not exceed 0.01 mm for an axial point, 0.015 mm for an off-axis point in the sagittal section, and 0.028 mm in the meridional section.

The optical system of a television camera, whose optical arrangement is shown in FIG. 3, has an angular field of 10°, a relative aperture of 1:1.5, and a focal length of 91.4 mm. Residual aberrations (FIG. 12) does not exceed 0.01 mm throughout the frame for the object axial and off-axis points.

The optical system of a television camera, whose optical arrangement is shown in FIG. 4, has an angular field of 30°, a relative aperture of 1:1.5, and a focal length of 30 mm. Residual aberrations (FIG. 13) do not exceed 0.005 mm for an axial point, and 0.03 mm for the field edge.

The optical system of a television camera, whose optical arrangement is shown in FIG. 5, has an angular field of 12°, a relative aperture of 1:1.0, and a focal length of 80 mm. Residual aberrations (FIG. 14) do not exceed 0.01 mm for axial points, and 0.03 mm for off-axis points.

The optical system of a television camera, whose optical arrangement is shown in FIG. 6, has an angular field of 25°, a relative aperture of 1:2.0, and a focal length of 36 mm. Residual aberrations (FIG. 15) do not exceed 0.01 mm for an axial point, and 0.023 mm for an off-axis point.

The optical system of a television camera, whose optical arrangement is shown in FIG. 7, has an angular field of 10°, a relative aperture of 1:2.0, and a focal length of 91.4 mm. Residual aberrations (FIG. 16) do not exceed 0.003 mm for an axial point, and 0.04 mm for an off-axis point at the edge of the field.

The optical system of a television camera, whose optical arrangement is shown in FIG. 8, has an angular field of 15°, a relative aperture of 1:1.8, and a focal length of 60.8 mm. Residual aberrations (FIG. 17) do not exceed 0.01 mm for axial points, and 0.03 mm for off-axis points.

The optical system of a television camera, whose optical arrangement is shown in FIG. 9, has an angular field of 18°, a relative aperture of 1:2.0, and a focal length of 50.5 mm. Residual aberrations (FIG. 18) do not exceed 0.01 mm for axial points, and 0.022 mm for off-axis points.

In summary, these embodiments of optical systems of television cameras, which are represented in optical arrangements and residual aberration charts, have, according to the invention, relative apertures within a range of from 1:1.0 to 1:2.0, angular fields from 10° to 35°, and focal length from 30 mm to 91.4 mm. These optical systems made according to the invention can operate over a much broader range of fields, relative apertures, and focal lengths, but only high-aperture systems have been taken as examples. The spectral range of the proposed optical system for a television camera is also broad enough, and it can operate in the ultraviolet and infrared portions of the spectrum.

INDUSTRIAL APPLICABILITY

The invention is applicable in nuclear-power, electronic and metallurgical industries, in medical instrument engineering, and those fields of industry where special types of monitoring and testing is required, such as monitoring of superprecise manufacturing processes where measuring of linear dimensions and volumes is involved or investigation of fine-grain structures is to be done for their automatic counting and selection. It can also be used for monitoring biological objects, or remote monitoring of mechanisms and instruments or devices.

We claim:

1. An optical system of a television camera, comprising, arranged successively in the direction of the light flux on one optical axis, an objective composed of n elements and a faceplate of a television tube, a light-sensitive layer being located on a last, in the direction of the light flux, surface of said faceplate, and the last, in the direction of the light flux, element of the objective having an optical power other than zero and being used as the faceplate of the television tube, wherein the last element of the objective is a concave-flat lens having its concavity facing the object.

2. An optical system as claimed in claim 1, wherein a first element of said objective is a biconvex lens and a biconcave lens cemented together, a second element of said objective is a biconvex lens and a biconcave lens cemented together, and a third element of said objective is a biconvex lens and a biconcave lens cemented together.

3. An optical system of a television camera, comprising, arranged successively in the direction of the light flux on one optical axis, an objective composed of n elements and a faceplate of a television tube, a light-sensitive layer being located on a last, in the direction of the light flux, surface of said faceplate, and the last, in the direction of the light flux, element of the objective having an optical power other than zero and being used as the faceplate of the television tube, wherein the last element of the objective is a positive convex-flat lens having its convexity facing the object.

4. An optical system as claimed in claim 3, wherein a first element of said objective is a biconvex lens and a negative meniscus cemented together, a second element of said objective is a negative meniscus, a third element of said objective is a biconcave lens and a biconvex lens cemented together, a fourth element of said objective is a biconvex lens and a fifth element of said objective is a biconcave lens.

5. An optical system of a television camera, comprising, arranged successively in the direction of the light flux on one optical axis, an objective composed of n elements and a faceplate of a television tube, a light-sensitive layer being located on a last, in the direction of the light flux, surface of said faceplate, and the last, in the direction of the light flux, element of the objective having an optical power other than zero and being used as the faceplate of the television tube, wherein the last element of the objective is made as a negative meniscus having the concavity thereof facing the picture.

6. An optical system as claimed in claim 5, wherein a first element of said objective is a biconvex lens and a negative meniscus, having a concavity facing said object, cemented together, a second element of said objective is a negative meniscus and a positive meniscus having concavities facing said picture and cemented together, and a third element of said objective is a biconvex lens and a biconcave lens cemented together.

7. An optical system of a television camera, comprising, arranged successively in the direction of the light flux on one optical axis, an objective composed of n elements and a faceplate of a television tube, a light-sensitive layer being located on a last, in the direction of the light flux, surface of said faceplate, and the last, in the direction of the light flux, element of the objective having an optical power other than zero and being used as the faceplate of the television tube, wherein the last element of the objective is made as a combination of a positive meniscus and a negative meniscus cemented together and having the concavity thereof facing the picture.

8. An optical system as claimed in claim 7, wherein a first element of said objective is a positive meniscus having a concavity facing said picture, a negative meniscus having a concavity facing said picture, and a biconvex lens and a biconcave lens cemented together.

9. An optical system of a television camera, comprising, arranged successively in the direction of the light flux on one optical axis, an objective composed of n elements and a faceplate of a television tube, a light-sensitive layer being located on a last, in the direction of the light flux, surface of said faceplate, and the last, in the direction of the light flux, element of the objective having an optical power other than zero and being used as the faceplate of the television tube, wherein the last element of the objective is made as a combination of a negative meniscus and a positive meniscus having the concavity thereof facing the picture.

10. An optical system as claimed in claim 9, wherein a first element of said objective is a biconvex lens, a second element of said objective is a biconcave lens, and a third element of said objective is a biconvex lens and a biconcave lens cemented together.

11. An optical system of a television camera, comprising, arranged successively in the direction of the light flux on one optical axis, an objective composed of n elements and a faceplate of a television tube, a light-sensitive layer being located on a last, in the direction of the light flux, surface of said faceplate, and the last, in the direction of the light flux, element of the objective having an optical power other than zero and being used as the faceplate of the television tube, wherein the last element is made as a combination of a biconvex lens and a biconcave lens cemented together.

12. An optical system as claimed in claim 11, wherein a first element of said objective is a biconvex lens and a biconcave lens cemented together, a second element of said objective is a biconvex lens and a negative meniscus, having a concavity facing said object, cemented together, and a third element of said objective is a positive meniscus having a concavity facing said picture.

13. An optical system of a television camera, comprising, arranged successively in the direction of the light flux on one optical axis, an objective composed of n elements and a faceplate of a television tube, a light-sensitive layer being located on a last, in the direction of the light flux, surface of said faceplate, and the last, in the direction of the light flux, element of the objective having an optical power other than zero and being used as the faceplate of the television tube, wherein the last element of the objective is a biconcave lens, a first element of said objective is a biconvex lens, a second element of said objective is a biconvex lens, a third element of said objective is a biconcave lens, a fourth element of said objective is a biconcave lens, a fifth element of said objective is a positive meniscus having a concavity facing said picture, a sixth element of said objective is a biconvex lens and a seventh element of said objective is a positive meniscus having a concavity facing said picture.

14. An optical system of a television camera, comprising, arranged successively in the direction of the light flux on one optical axis, an objective composed of n elements and a faceplate of a television tube, a light-sensitive layer being located on a last, in the direction of the light flux, surface of said faceplate, and the last, in the direction of the light flux, element of the objective having an optical power other than zero and being used as the faceplate of the television tube, wherein the last element of the objective is a flat-concave lens having the concavity thereof facing the picture, a first element of said objective is a biconvex lens, a second element of said objective is a positive meniscus and a negative meniscus cemented together and having a concavity facing said picture, a third element of said objective is a biconcave lens and a biconvex lens cemented together, a fourth element of said objective is a positive meniscus having a concavity facing said object, a fifth element of said objective is a positive meniscus having a concavity facing said picture and a sixth element of said objective is a positive meniscus having a concavity facing said picture.

15. An optical system of a television camera, comprising, arranged successively in the direction of the light flux on one optical axis, an objective composed of n elements and a faceplate of a television tube, a light-sensitive layer being located on a last, in the direction of the light flux, surface of said faceplate, and the last, in the direction of the light flux, element of the objective having an optical power other than zero and being used as the faceplate of the television tube, wherein the last element of the objective is made as a positive meniscus having the concavity thereof facing the picture, a first element of said objective is a biconvex lens and a biconcave lens cemented together, a second element of said objective is a negative meniscus having a concavity facing said picture, and a third element of said objective is a biconvex lens and a biconcave lens cemented together.

* * * * *